June 7, 1955  D. J. FRENCH  2,710,200
HITCH FOR MULTIPLE UNIT VEHICLES
Filed June 16, 1952
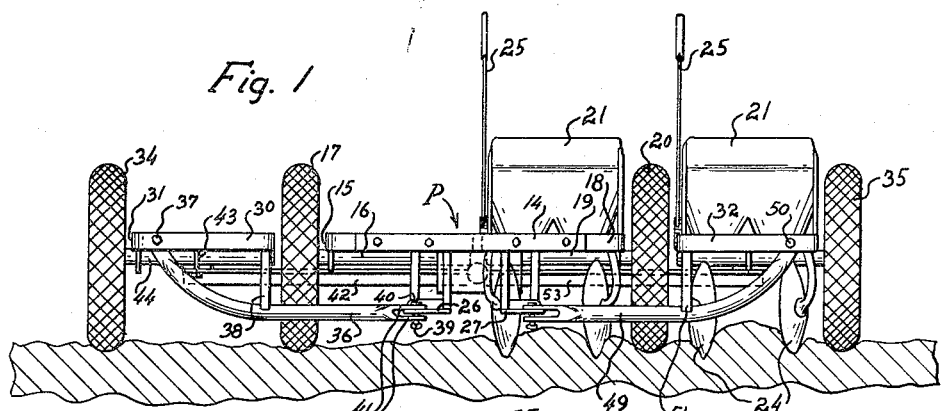
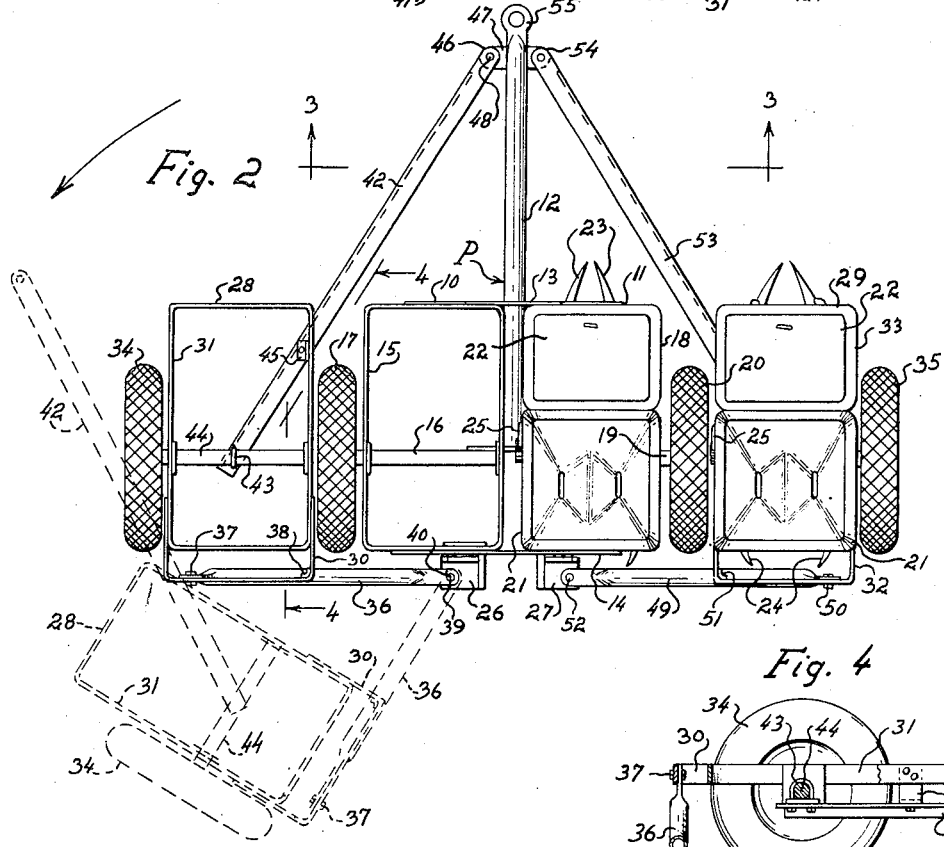
INVENTOR
DAMAS J. FRENCH
BY Williamson, Williamson
Schroeder & Adams ATTORNEYS ated June 7, 1955

2,710,200
HITCH FOR MULTIPLE UNIT VEHICLES

Damas J. French, Grafton, N. Dak.

Application June 16, 1952, Serial No. 293,792

2 Claims. (Cl. 280—411)

This invention relates to an expansible multiple unit vehicle and more particularly to a hitch arrangement for a potato planter of the multiple type.

It is a general object of this invention to provide for a simple and efficient hitch arrangement which will make possible the conversion into a single piece of apparatus of a double wheeled vehicle unit together with one or more single wheeled units such as those commonly manufactured, each typical unit having a bin, a frame, opening gangs, seed planting mechanism, closing gangs and a single side-mounted wheel the position of which is opposed to that of the other unit to which it is normally attached.

It is another object of this invention to provide an expansible apparatus which can be used as a double unit for example in planting two rows of potatoes and the like or may have an additional single unit removably attached to either or both sides of said double unit to increase the capacity thereof, yet utilizing a single hitch adapted to be drawn by a single vehicle.

It is a still further object of this invention to provide for an expansible apparatus such as a potato planter in which a basic double unit having a drawbar for attachment to a vehicle may be coupled with other single units each quickly removable or partially removable for repair of tires and for general accessibility to the working parts thereof.

It is a still further object of the invention to provide an apparatus such as a potato planter which is extremely adaptable to large scale operation while maintaining a high degree of efficiency and economy in the cost in the equipment and the use thereof.

These and other objects and advantages of my invention will more fully appear from the following description made in connection with the accompanying drawings wherein like reference characters refer to similar parts throughout the several views and in which:

Fig. 1 is a rear elevation of my expansible apparatus in the form of a potato planter showing the original double unit with two single units attached thereto, one at each side. The bin and planting mechanism is deleted from two of the units to better show the hitch arrangement;

Fig. 2 is a top elevation of my potato planter as shown in Fig. 1 with the hitch arrangement in full line in preparation for use and also with one side unit swung to dotted line position for mechanical repairs upon the planter;

Fig. 3 is a sectional view through the drawbar and connecting braces taken on the lines 3—3 of Fig. 2; and Fig. 4 is a vertical section through the frame of the potato planter on the lines 4—4 of Fig. 2 looking in the direction of the arrows.

Referring now to the drawing, the letter P indicates generally a double unit potato planter of the type manufactured by the A. B. Farquhar Company and comprising two single-wheeled potato planting units 10 to the left as viewed in Fig. 2 and 11 as viewed to the right in Fig. 2. The single units 10 and 11 are mounted for sideways adjustment upon a drawbar 12 having secured thereto lateral brackets 13 at the fore and 14 at the rear. The unit 10 has a shaft 16 journaled to its frame 15 which extends outwardly to the left and has at its outwardly extending portion a wheel 17 preferably of the rubber tired variety. In a similar manner the potato planter unit 11 has a frame 18 adjustably secured to the brackets 13 and 14 and has journaled thereto a shaft 19 which extends to the right thereof as viewed in Fig. 2. The shaft 19 has a wheel 20 similar to the wheel 17 of the unit 10. It may thus be seen that the units 10 and 11 are identical except for the reversal of parts as shown. Superstructure and potato planting mechanism, the function of which is old in the art, is mounted upon each of the units through its respective frame. Generally, the parts of the potato planter are the seed potato bin 21, the fertilizer bin 22, a pair of opening gangs 23, a pair of closing gangs 24 and lever mechanism 25 for adjusting the operation thereof during forward travel. The operation of each potato planting unit is such that in the forward travel of the unit the opening gangs 23 divide the earth into a trench along the bottom of which seed potatoes are spaced by the planting mechanism (not shown), following which the closing gangs 24 cover and hill the planted potatoes. The units 10 and 11 are adjustable upon the brackets 13 and 14 so as to vary the width between the planted rows according to the desires of the operator. The most forwardly point of drawbar 12 terminates in a hitch 55 for attachment to the rear end of a vehicle such as a tractor.

My invention comprises a hitch structure which can convert the foregoing double planter P into an expanded multiple planter having great versatility as well as efficiency in operation. I attach to the frame 15 of the unit 10 a pivot mount 26 and to the frame 18 of unit 11 I secure in a similar manner a pivot mount 27. It is understood that the mount may be adjustably secured so as to vary its position in a sideways manner similar to the sideways adjustment of the planting units 10 and 11 with respect to one another.

A single potato planting unit 28 which may be identical in construction to the unit 10, but separated from attachment to its matching unit and from its drawbar structure, is mounted to the left of the standard potato planter P as shown in Fig. 2. A similar potato planting unit 29 but with its wheel position reversed, such as that of the matching unit 11 with respect to its mate 10, may be similarly arranged to the right of the standard potato planter P as shown in Fig. 2. A rigid frame extension 30 is secured to the frame 31 of the unit 28 and a corresponding frame extension 32 may be secured to the frame 33 of unit 29. Supporting brace means or connector elements are then attached to the single units so as to form with the single wheel 34 on unit 28 and wheel 35 on unit 29, a stable structure yet having rockable and pivotal qualities as will hereafter be described. A rearward brace 36 is secured as at 37 and 38 to the frame extension of the unit 28 as shown in Fig. 1. The brace 36 has a pivot connection at 39 with the potato planting unit 10. This pivot connection 39 may be through a clevis arrangement as shown with a vertical pin 40 extending therethrough, the opposed legs 41 of the clevis being separated sufficiently to allow limited up and down rocking movement of the brace 36 with respect to the planting unit 10. A forwardly extending brace 42 is attached to the left potato planting unit 28 preferably in a rigid manner and at an angle lateral to the general longitudinal disposition of the unit 28. The attachment may be through such means as U-bolt 43 which is secured to shaft 44 and a bracket 45 secured to the frame 31 of unit 28. The forwardly extending end of brace or connector element 42 has a detachable pivotal connection at 46 to a cross strut 47 attached to the drawbar 12. The connection 46 may be accomplished by a removable pin 48 extending through openings in the strut 47 and the end of forward brace 42. Where the unit 29 is similarly attached to the double potato planter P a left rearward brace 49 is secured to the rearward extension 32 of frame 33 as at 50 and 51 as shown in detail in Fig. 1. The rear brace 49 is pivotally secured to member 27 by pivot connection 52 which is similar to the pivot connection 39 between the potato planter 10 and potato planting unit 28. Similarly a forwardly extending brace 53 is secured to the unit 29 and extends laterally to its pivot connection 54 which is similar to pivot connection 46 but at the opposite side of strut 47 which is in turn rigidly attached to drawbar 12. It is understood that the units 28 and 29 may be taken from a complete double planter unit identical in every respect to the planter P with unit 28 being the counterpart of unit 10 and unit 29 being the counterpart of unit 11. It will be observed that the pivot connection 46 at the forward end of the multiple unit potato planter is generally aligned in a longitudinal direction with the pivot connection 39 which is disposed at the rear.

In the operation of the multiple unit potato planter the outside units 28 and 29 may move upwardly and downwardly to a limited degree about the pivot connections 46 and 39 in respect to the left hand unit 28, and similarly may rock to a limited degree about the pivot connections 54 and 52 in respect to the right hand unit 29. This is an important feature of my invention since it is desirable to allow the outside planter units to move upwardly and downwardly where the terrain is uneven, thus causing the seed potato to be planted at the proper depth and in a manner similar to that accomplished by the central and original planter P. Where it is desired to repair a portion of the entire multiple unit potato planter such as, for example, the tire 17, the repair may be accomplished even though the bins 21 and 22 are filled respectively with seed potatoes and fertilizer and further even though the multiple unit potato planter may be in operation in the field. Such repair may be accomplished by the simple expedient of removing pivot pin 48 which will release the connection between the forward brace 42 and strut 47 and the unit 28 may be pivoted at its connection 39 between rear brace 36 and the unit 10 by manually moving the forward brace 42 in the direction of the arrow. This will place the unit 28 in the position shown by dotted lines which will afford complete accessibility to all parts of the double unit potato planter P to the left of drawbar 12 as well as to all parts of the planting unit 28. In a similar manner the unit 29 may be pivotally displaced to afford accessibility to all parts of multiple unit planter P to the right of drawbar 12 as well as to all parts of the unit 29 itself. It will be noted that the pivot connection 39 must be such as to allow limited up and down movement of rear brace 36 when in operative position and also to allow horizontal rotation thereabout during repair of the planter. On the other hand, it is necessary only that pivot connection 46 be such as to allow limited up and down movement comparable to that of pivot connection 39 but requiring no horizontal pivotal movement through pin 48. It is a requisite that at least one of the braces 42 or 36 be rigidly attached to the potato planting unit 28 in order to support and stabilize the single wheeled unit 28 during its operative attachment. The foregoing remarks, of course, apply to the single-wheeled unit 29 as well.

It will, of course, be understood that various changes may be made in the form, details, arrangement and proportions of the parts without departing from the scope of my invention.

What I claim is:

1. A hitch mechanism for a single-wheeled unit, such as a potato planter, adapted to be secured for travel in side-by-side and close-coupled alignment with a wheeled apparatus having supporting wheels at the sides thereof and a medially disposed drawbar extending forwardly for attachment to a vehicle such as a tractor, said hitch mechanism comprising a brace rigidly secured to the rear of said single-wheeled unit, pivotal connecting means secured to said wheeled apparatus rearwardly of the wheel at one side thereof for pivotally securing and supporting said rear brace, and a second brace rigidly secured to said single-wheeled unit in underlying supporting relation and extending forwardly and inwardly toward said drawbar for releasable connection thereto at a point forwardly of the attachment of said drawbar to said wheeled apparatus, whereby said single-wheeled unit may have its connection broken between said forwardly extending brace and the drawbar and may be pivotally swung about said rearward pivotal connection without detaching the latter and maintaining the support of said single-wheeled unit upon said rearward pivotal connection upon the wheel of said unit and upon the forward end of said second brace to maintain working clearance between the single-wheeled unit and the wheeled apparatus for repairing and maintaining structure and mechanism normally unexposed when the single-wheeled unit is attached operatively to the wheeled apparatus.

2. A hitch mechanism for a single-wheeled unit, such as a potato planter, adapted to be secured for travel in side-by-side and close-coupled alignment with a wheeled apparatus having supporting wheels at the side thereof and a medially disposed drawbar extending forwardly for attachment to a vehicle such as a tractor, said hitch mechanism comprising a brace rigidly secured to the rear of said single-wheeled unit and extending laterally therefrom in a direction opposite that of the single-wheel, pivotal connecting means secured to the wheeled apparatus at a rearward and medial position for securing and supporting said rear brace for pivotal swinging movement of said single-wheeled unit rearwardly of said wheeled apparatus for permitting limited vertical movement to compensate for uneven terrain, and a second brace rigidly secured to said single-wheeled unit in underlying supporting relation and extending angularly in a forward direction toward said drawbar for releasable connection thereto at a point forwardly of the attachment of said drawbar to said wheeled apparatus, said releasable connection permitting limited vertical movement of said single-wheeled unit with respect to the wheeled apparatus, whereby said single-wheeled unit may have its connection broken between said forwardly extending brace and the drawbar and may be pivotally swung about said rearward pivotal connection without disconnection thereof while maintaining the support of said single-wheeled unit upon the rearward pivotal connection, upon the wheel of said unit and upon the forward end of said second brace in ground contacting position to maintaining working clearance between the single-wheeled unit and the wheeled apparatus for repairing and maintaining structure and mechanism normally unexposed when the single-wheeled unit is attached operatively to the wheeled apparatus.

References Cited in the file of this patent

UNITED STATES PATENTS

| | | |
|---|---|---|
| 31,072 | Brinkerhoff | Jan. 8, 1861 |
| 309,706 | Gale | Dec. 23, 1884 |
| 372,743 | Carson | Nov. 8, 1887 |
| 2,052,302 | Johnson et al. | Aug. 25, 1936 |
| 2,095,417 | Messersmith et al. | Oct. 12, 1937 |